United States Patent

Noguchi et al.

Patent Number: 5,774,478
Date of Patent: Jun. 30, 1998

[54] INTERPOLATION CIRCUIT FOR INTERPOLATING ERROR DATA BLOCK GENERATED IN Σ MODULATED DATA STREAM

[75] Inventors: Masayoshi Noguchi, Chiba; Gen Ichimura, Tokyo, both of Japan

[73] Assignee: Sony Corporation, Tokyo, Japan

[21] Appl. No.: 619,794

[22] Filed: Mar. 20, 1996

[30] Foreign Application Priority Data

Mar. 24, 1995 [JP] Japan .................................. 7-066425

[51] Int. Cl.⁶ .............................. G06F 11/00; G06F 7/38
[52] U.S. Cl. ............................................. 371/31; 364/723
[58] Field of Search ..................... 364/723; 395/2.74; 371/46, 31; 375/25

[56] References Cited

U.S. PATENT DOCUMENTS

| | | | |
|---|---|---|---|
| 4,224,689 | 9/1980 | Sunberg | 371/6 |
| 4,497,055 | 1/1985 | Hoshino et al. | 371/31 |
| 4,639,920 | 1/1987 | Kaneko | 371/31 |
| 4,641,309 | 2/1987 | Nakano et al. | 371/31 |
| 4,716,565 | 12/1987 | Suma | 371/31 |
| 5,243,428 | 9/1993 | Challapali et al. | 348/607 |
| 5,463,714 | 10/1995 | Han | 395/2.74 |

FOREIGN PATENT DOCUMENTS

| | | |
|---|---|---|
| 00811387 | 6/1983 | European Pat. Off. |
| 0234354 | 9/1987 | European Pat. Off. |
| 0241980 | 10/1987 | European Pat. Off. |
| 1055788 | 3/1989 | Japan |
| 3248376 | 11/1991 | Japan |
| 2217902 | 11/1989 | United Kingdom |

OTHER PUBLICATIONS

Japanese Patent Abstract, Publ. No. 1–55788, Tsukuru Hougiyoku, Data Interpolating Device For Digital Signal, Mar. 2, 1989.

Japanese Patent Abstract, Publ. No. 3–248376, Kiyotaka Nagai, Voice Band Division Decoder, Nov. 6, 1991.

Primary Examiner—Reba I. Elmore
Assistant Examiner—Robert J. Dolan
Attorney, Agent, or Firm—Jay H. Maioli

[57] ABSTRACT

An interpolation circuit and a recording and/or reproducing apparatus including an interpolation circuit are disclosed. The interpolating circuit calculates an average value of data positioned upstream and downstream of a defective data portion generated in a data string by an FIR filter having pre-set coefficient values, and calculates interpolated data from the average value. The Interpolation circuit also calculates an average value of data containing the defective data portion using the FIR filter and calculates the difference from the interpolated data for estimating the arraying pattern of the defective data portion. The interpolation circuit then determines an optimum array in the estimated arraying pattern and substitutes the optimum array for the defective data for repairing the defective data.

8 Claims, 10 Drawing Sheets

INTERPOLATION CIRCUIT FOR INTERPOLATING ERROR DATA BLOCK GENERATED IN Σ MODULATED DATA STREAM

BACKGROUND OF THE INVENTION

1. Field of the Invention

This invention relates to a method and apparatus for interpolating digital data for interpolating defective data generated in terms of a pre-set number of samples as a unit during transmission of digital data digitized on the 1-bit basis.

2. Description of the Related Art

A method of recording, reproducing and transmitting digital signals converted from analog signals has hitherto been practiced in recording and/or reproducing apparatuses employing optical discs, such as a compact disc (CD), or an apparatus employing magnetic tapes, such as a digital audio tape (DAT), or an apparatus employing digital broadcasting, such as satellite broadcasting. In the conventional digital audio transmission apparatus, described above, a sampling frequency of 48 kHz or 44.1 kHz and the number of quantization bits of 16 have been prescribed as a format for converting the digital signals.

However, with the above-enumerated digital audio transmission apparatuses, the number of quantization bits of the digital audio data generally determines the dynamic range of demodulated audio signals. For transmitting high-quality audio signals, it is necessary to enlarge the number of quantization bits from the current 16 bits to 20 or 24 bits. However, once the quantization bits are fixed at a pre-set value, the signal processing system is correspondingly designed, so that the number of quantization bits can hardly be increased.

For digitizing the audio signals, a method known as sigma-delta (ΣΔ) modulation has been proposed by Y.Yamazaki, "AD/DA Converter and Digital Filter", J. of Japan Society of Acoustics, Vol.46, No.3 (1990), pages 251 to 257.

Figure 1:
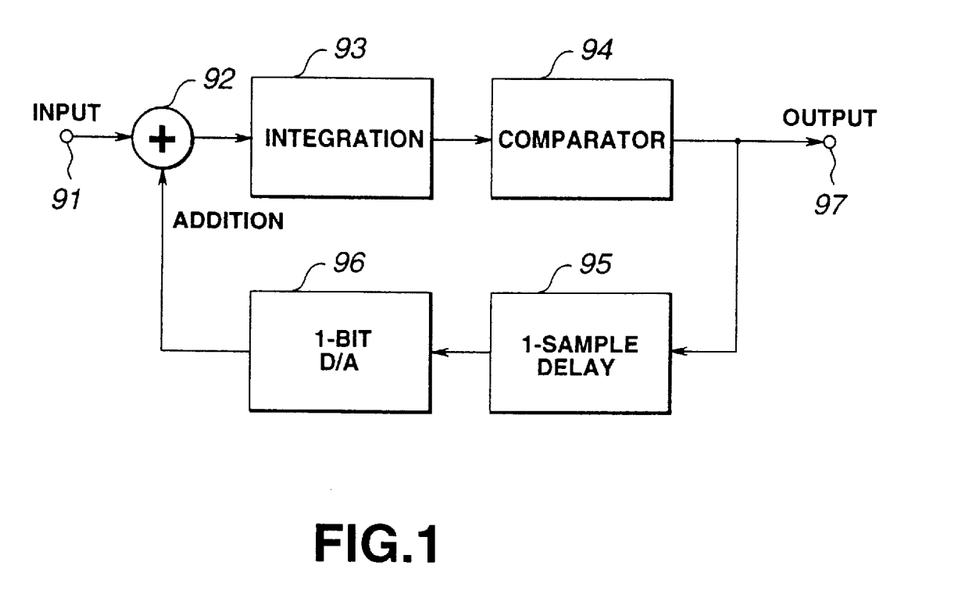
FIG. 1 is a ΣΔ modulation circuit for generating 1-bit digital data.

FIG. 1 shows the construction of a 1-bit 7A modulation circuit. In this figure, input audio signals are supplied at an input terminal 91 via an adder 92 to an integration circuit 93. An output signal from the integrator 93 is supplied to a comparator 94 where it is compared to a neutral point potential of the input audio signal so as to be quantized by one bit every sampling period. The frequency of the sampling period (sampling frequency) is 64 or 128 times the conventional frequency of 48 kHz or 44.1 kHz. The quantization bits may also be 2 or 4 bits.

The quantized data is supplied to a one-sample delay unit 95 and thereby delayed by one sampling period. The delayed data is converted by, for example, a 1-bit D/A converter 96 into analog signals which are supplied to an adder 92 where it is added to the input audio signal from the input terminal 91. The quantized data outputted by the comparator 94 is taken out at an output terminal 97. By the sigma-delta (ΣΔ) modulation, performed by the ΣΔ modulation circuit showing in FIG. 1, audio signals of a broader dynamic range may be obtained, even with the number of bits as small as one bit, by setting the sampling period frequency to a sufficiently higher value. In addition, a sufficiently broad range of transmission may be assured. On the other hand, the ΣΔ modulation circuit structure lends itself to integration, and high A/D conversion precision may be achieved relatively easily, so that it is extensively used within the A/D converter.

By taking advantage of these characteristics, the ΣΔ modulation circuit may be applied to a recorder handling high-quality data, or to data transmission.

If, with the above-described digital audio data, trouble occurs in the transmission system, and bad data is produced, the data is fixed at "1" or "0". In digital audio data, continuous "1"s or "0"s correspond to a positive maximum value and a negative maximum value of the demodulated signal, respectively. If, for example, part of the signal is defective, the maximum level noise is produced in the defective portion, thus possibly destroying a monitor amplifier or speaker.

Thus, in a CD or DAT for which the format for 16 bits is prescribed as the number of quantization bits, the signal format is set so that the continuous "1"s or "0"s assume an intermediate value in the demodulated signal without becoming of the maximum level. Thus, even if defective data is produced as described above, there is no risk of generation of the maximum noise level. Also, an error correction code is provided in the data so that data errors, if any, may be concealed to a pre-set extent. For data defects exceeding the ability of the error correction code, data lying ahead of or following the defective data are used for interpolation, or data directly ahead of the defective data is held for possibly avoiding problems in connection with the human perceptual sense.

Figure 2:
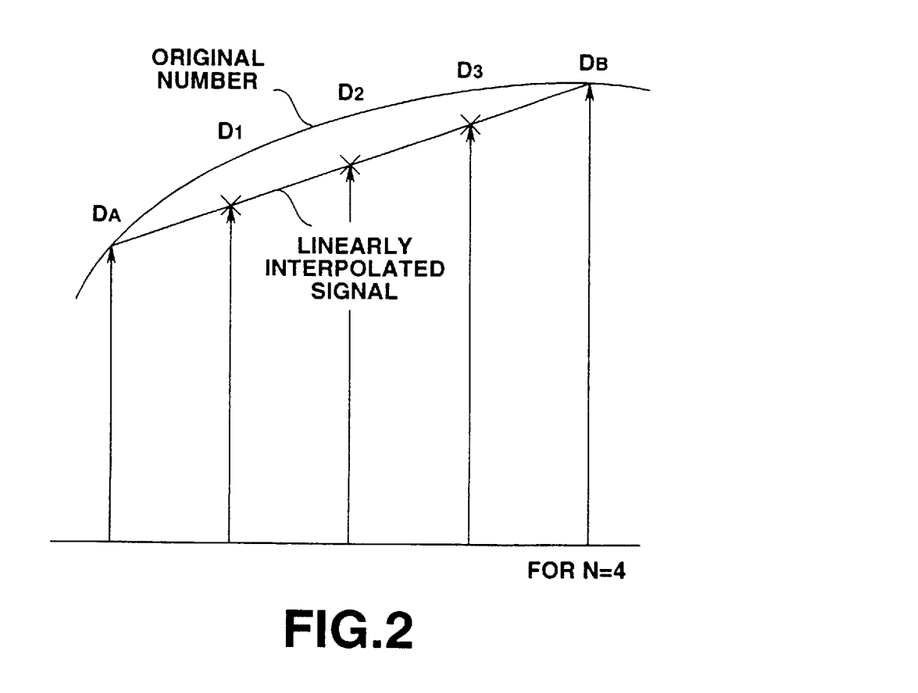
FIG. 2 illustrates linear interpolation.
Figure 3A:
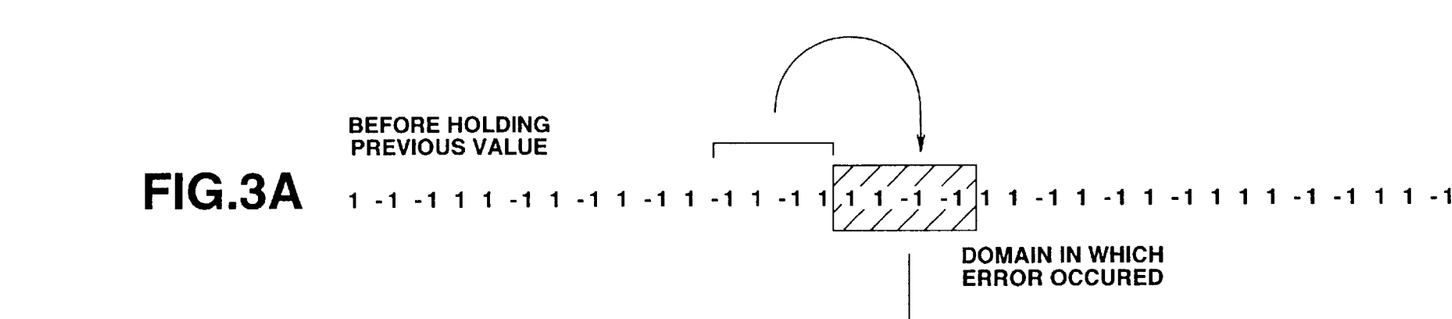
FIG. 3A illustrates a data string prior to pre-hold processing.
Figure 3B:
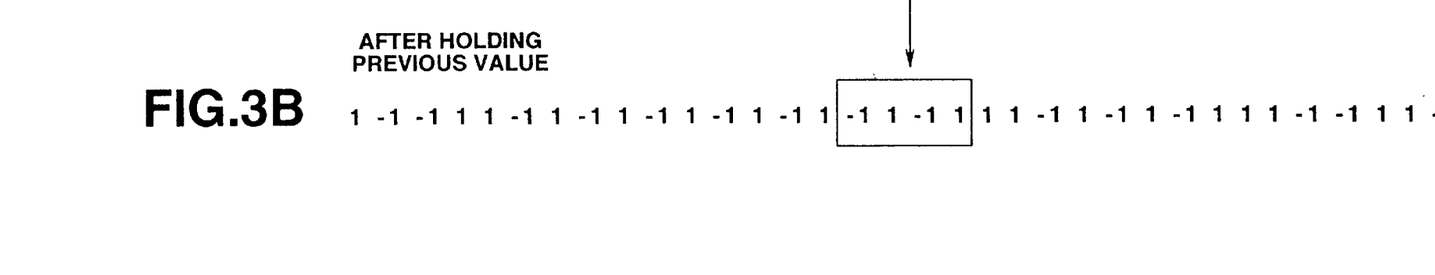
FIG. 3B illustrates a data string subsequent to pre-hold processing.

For such interpolation, processing employing linear interpolation as shown for example in FIG. 2 is performed. In FIG. 2, interpolated data Dn, where n is an integer from 1 to N, is found by the following equation (1):

$$D_n = D_A + n \times (D_B - D_A)/N$$

where N is the number of bad data, $D_A$ is data directly before the bad data and $D_B$ is data directly following the bad data.

However, with ΣΔ modulation, since the word length of each data is short and is equal to, for example, 1 bit, interpolation using the preceding data or the succeeding data as described above cannot be made. Thus, a method known as a pre-hold method consisting of replacing the defective data portion by a block of the previous data of the same length as the defective data portion may be employed. This method, however, cannot be said to be useful since the junction point is occasionally not smooth and an extremely large noise tends to be produced.

It may also be envisaged to transform data resulting from the above-mentioned ΣΔ modulation into data of the conventional s signal format for CD or DAT using a decimation filter. If the modulated data is transformed into data of the conventional signal format as described above, it becomes possible to avoid any problem in connection with the human hearing mechanism by performing interpolation in the same way as conventionally done or by holding the directly previous data. However, the characteristics of the processed signals are assimilated to those of the conventional CD or DAT, such that characteristics proper to the ΣΔ signals, such as broad bandwidths or high dynamic range, cannot be exploited.

Thus, if bad data is produced due to trouble in the transmission system, there is no method available in ΣΔ modulation for repairing the errors by, for example, interpolation. Accordingly it h as been extremely difficult to exploit the ΣΔ modulation in the usual transmission system.

SUMMARY OF THE INVENTION

It is therefore an object of the present invention to provide a method and apparatus for interpolating digital data by interpolating defective portions generated in ΣΔ modulated 1-bit data by simplified arithmetic-logical operations.

In one aspect, the present invention provides an interpolation apparatus for interpolating a defective data block constituted by pre-set bits and which has been produced during transmission of digital data digitized by ΣΔ modulation. The apparatus includes means for calculating a first average value of a data string positioned upstream of the defective data block and not containing the defective data block, a second average value of a data string positioned downstream of the defective data block and not containing the defective data block, and a third average value based upon data lying directly ahead and at back of the defective data block in the data string containing the defective data block. The apparatus also includes means for generating interpolated data based upon the first average value and the second average value as calculated by the calculating means, and means for estimating an arraying pattern of the defective data block based upon the interpolated data generated by the generating means and the third average value as found by the calculating means. The apparatus further includes interpolated data generating means for determining interpolated data of the defective data block based upon the arraying pattern estimated by the estimation means.

In another aspect, the present invention provides a reproducing apparatus for reproducing digital data digitized by ΣΔ modulation from a recording medium on which the digital data is pre-recorded. The reproducing apparatus includes means for detecting a defective data block in the reproduced digital data, means for calculating a first average value of a data string positioned upstream of the defective data block and not containing the defective data block, a second average value of a data string positioned downstream of the defective data block and not containing the defective data block, and a third average value based upon data lying directly ahead and at back of the defective data block in the data string containing the defective data block. The apparatus also includes means for generating interpolated data based upon the first average value and the second average value as calculated by the calculating means, and means for estimating an arraying pattern of the defective data block based upon the interpolated data generated by the generating means and the third average value as found by the calculating means. The apparatus further includes interpolated data generating means for determining interpolated data of the defective data block based upon the arraying pattern estimated by the estimation means, and switching means for selecting the reproduced digital data or the digital data via the interpolated data generating means based upon the result of detection by the detection means.

In yet another aspect, the present invention provides a recording apparatus for recording digital data digitized by ΣΔ modulation on a recording medium. The recording apparatus includes means for detecting a defective data block in the digital data, means for calculating a first average value of a data string positioned upstream of the defective data block and not containing the defective data block, a second average value of a data string positioned downstream of the defective data block and not containing the defective data block, and a third average value based upon data lying directly ahead and at back of the defective data block in the data string containing the defective dat a block. The apparatus also includes means for generating interpolated data based upon the first average value and the second average value as calculated by the calculating means, and means for estimating an arraying pattern of the defective data block based upon the interpolated data generated by the generating means and the third average value as found by the calculating means, and interpolated data generating means for determining interpolated data of the defective data block based upon the arraying pattern estimated by the estimation means. The apparatus further includes switching means for selecting the reproduced digital data or the digital data via the interpolated data generating means based upon the result of detection by the detection means, and recording means for recording the digital data from the switching means on the recording medium.

According to the present invention, the defective data block is multiplied with a pre-set coefficient, while data lying directly ahead and at back of the defective data block is multiplied with a varying coefficient. The interpolated data is generated depending upon estimated numbers of "1"s and "0"s by simplified calculations without being dependent upon the arraying pattern of the defective data block.

DETAILED DESCRIPTION OF PREFERRED EMBODIMENTS

Referring to the drawings, preferred embodiments of the method and apparatus for interpolating digital data according to the present invention and a recording method and apparatus employing the interpolating apparatus will be explained in detail.

The present embodiment is directed to an interpolation circuit preferably employed for a digital audio recording and/or reproducing apparatus for modulating input audio signals by $\Sigma\Delta$ modulation and recording the modulated data in the form of 1-bit digital data on a recording medium, such as a magnetic tape, or reproducing 1-bit digital data from the recording medium and outputting the resulting analog audio signals. The interpolation circuit interpolates a defective data block that has not been corrected for errors by usual error correction operations.

Figure 4:
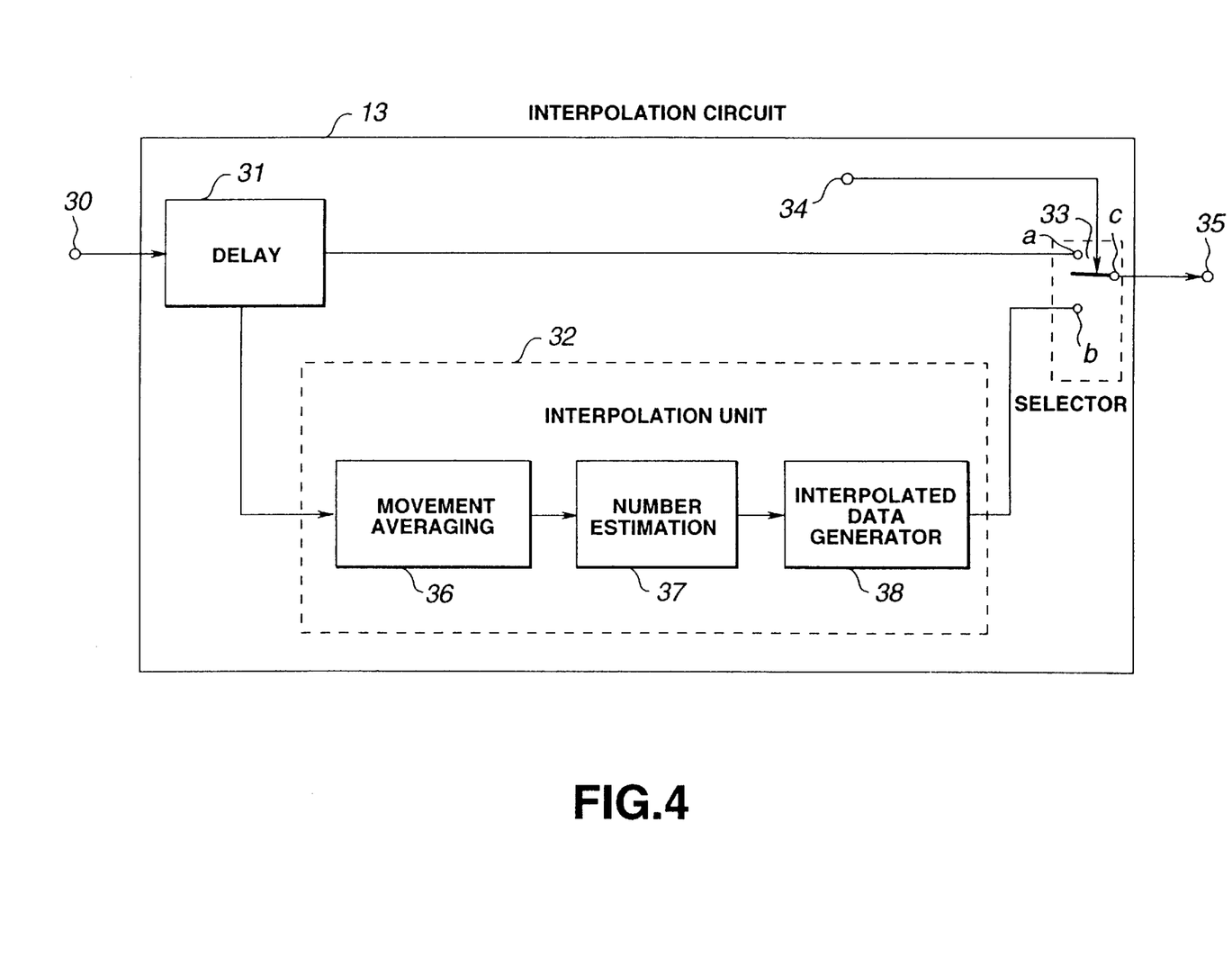
FIG. 4 is a block diagram showing an interpolation circuit according to the present invention.

Referring to FIG. 4, interpolation circuit 13 includes a moving averaging circuit 36, as multiplication means for multiplying the defective data block with a pre-set coefficient and for multiplying data lying ahead of and following the defective data block with varying coefficients. A number estimating processing circuit 37 for estimating the numbers of "1"s and "0"s making up the defective data block from an output of the moving averaging circuit 36. The interpolation circuit 13 also includes an interpolated data generating circuit 38 for determining an arraying pattern of the interpolated data of the defective data block, based upon the estimated results of the number estimating processing circuit 37 for generating the interpolated data. The operation of the interpolation circuit 13 will be explained subsequently.

Figure 5:
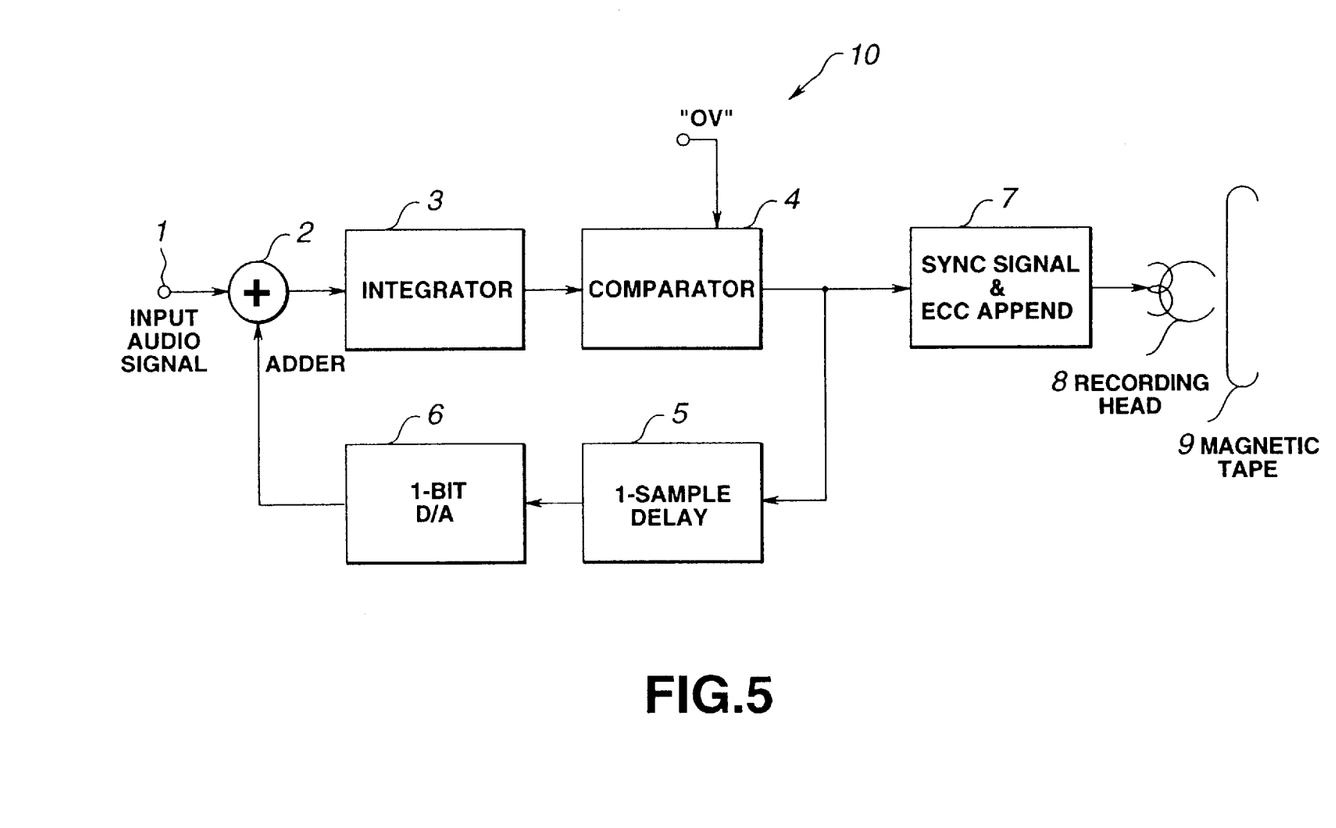
FIG. 5 is a block diagram showing a recording apparatus to which the ΣΔ modulation circuit shown in FIG. 1 is applied.

The digital audio recording and/or reproducing apparatus, employing the interpolation circuit 13, includes a recording unit 10, shown in FIG. 5. Recording unit 10 modulatesan input audio signal with $\Sigma\Delta$ modulation to provide 1-bit digital data and records the 1-bit digital audio data every pre-set number of the 1-bit data along with the synchronization signal and error correction code. A reproducing unit 20, shown in FIG. 6, reproduces the 1-bit digital data from a magnetic tape 9 of the recording unit 10 every pre-set number of the 1-bit data. While the interpolation circuit 13 is provided in the reproducing unit 20, the recording unit 10 is first explained.

In the recording unit 10, shown in FIG. 5, an input audio signal is supplied from an input terminal 1 via an adder 2 to an integrator 3. An output of the integrator 3 is supplied to a comparator 4 where it is compared to a neutral point potential ("0 V") of the input audio signal and quantized by 1-bit quantization every sampling period. The sampling period frequency, that is the sampling frequency, is set to 64 or 128 times as high as the 48 kHz or signal 44.1 kHz conventionally employed.

Figure 7:
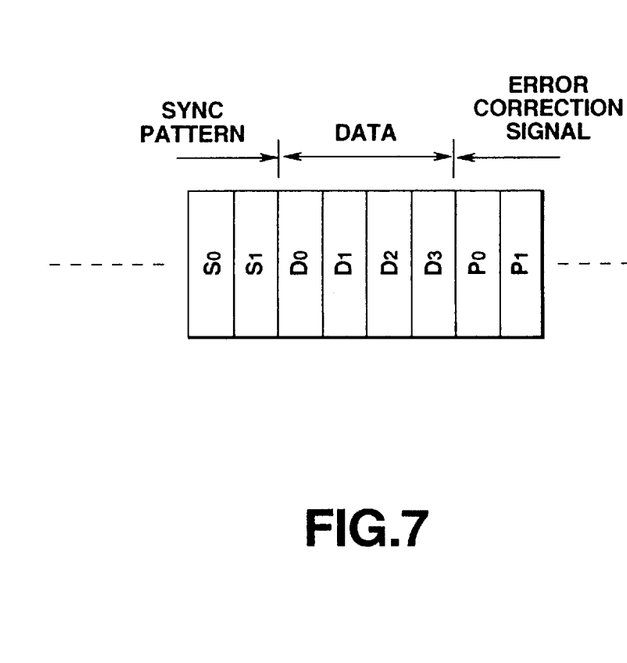
FIG. 7 illustrates a data structure of 1-bit data recorded on a recording medium of the present invention.

The quantized data is supplied to a 1-sample delay unit 5 where it is delayed one sampling period. The delayed data is supplied to a 1-bit digital/analog (D/A) converter 6 and then supplied to the adder 2 where it is summed to the input audio signal from the input terminal 1. The comparator 4 outputs a $\Sigma\Delta$ modulated quantized version of the input audio signal. The quantized data, outputted by the comparator 4, is supplied to an appending circuit 7 for synchronization signals and error correction codes (ECC) where the synchronization signals and error correction codes (ECC) are appended to the quantized data, every pre-set number of samples, as indicated by the recording format shown in FIG. 7. Recording head 8 then records on magnetic tape 9 using the recording format shown in FIG. 7. With the recording format shown in FIG. 7, four 1-bit digital data, each of which is the 1-bit quantized data, are collected together, such as data $D_0$ to $D_4$, and synchronization signals $S_0$ and $S_1$ and error correction codes $P_0$ and $P_1$ are appended every four 1-bit data. The synchronization signals $S_0$ and $S_1$ and error correction codes $P_0$ and $P_1$ are appended at the appending circuit 7 for synchronization signals and error correction codes. Any transmission errors, produced during recording and/or reproduction, may be detected and corrected by these error correction codes $P_0$ and $P_1$.

Figure 6:
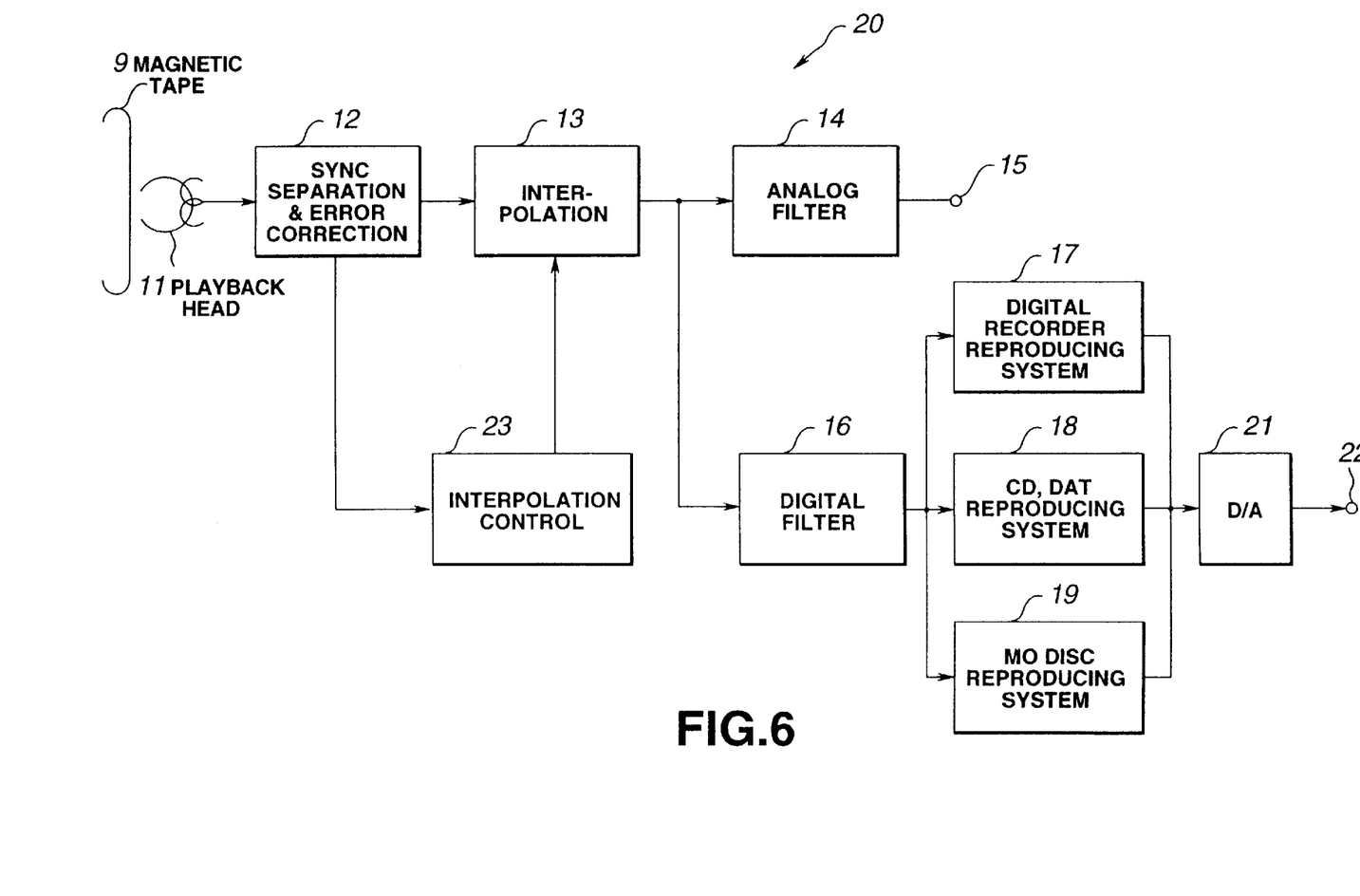
FIG. 6 is a block diagram showing a reproducing apparatus to which the interpolation circuit according to the present invention is applied.

The reproducing unit 20 shown in FIG. 6 reproduces 1-bit digital data recorded by the reproducing head 1 on the magnetic tape 9. The 1-bit digital data is recorded by the format having the synchronization signals and error correction codes appended thereto, so that, when the 1-bit digital data is supplied to synchronization signal separation and error correction circuit 12, the synchronization signals are separated from the 1-bit digital data, which is simultaneously corrected for errors, so that only four 1-bit digital data, grouped as one unit, produced by $\Sigma\Delta$ modulation of the input audio signal, is taken out at the reproducing unit 20.

However, during recording and/or reproduction, there are occasions wherein a defective data block contain defective data such that the block cannot be repaired to four 1-bit digital data grouped together as a unit. These defective data blocks are thought to be produced by trouble in the digital audio recording and/or reproducing apparatus or peripheral devices, damage to a recording medium 9 as a recording medium, or line breakages in the data transmission channel.

Thus, if defective data blocks that cannot be corrected by the synchronization signal separation and error correction circuit 12 are produced during recording or reproduction, the digital audio recording and/or reproducing apparatus 20 cause s the interpolation circuit 13 to output interpolated data of the defective data blocks. The interpolation circuit 13 performs the interpolation operation consisting of multiplying a defective data block made up of four 1-bit digital data with a coefficient remaining constant in value across the width of the defective data block, while multiplying data lying ahead of and following the defective data block with varying coefficients, estimating the numbers of "1"s and "0"s in the defective data block, and determining an arraying pattern of "0"s and "1"s while maintaining the total energy amount proper to the four 1-bit digital data. The interpolation operation by the interpolation circuit 13 is controlled by an interpolation processing control circuit 23. If there is no defective data block that cannot be corrected by the synchronization signal separation and error correction circuit 12, the interpolation circuit 13 outputs non-interpolated data in place of the interpolated data. The non-interpolated data is the four 1-bit digital data that is not the defective data block.

The interpolated data or the non-interpolated data, outputted by the interpolation circuit 13, is restored by an analog filter 14 to analog audio signals which are output at a monitor terminal 15.

The interpolated data or the non-interpolated data, outputted by the interpolation circuit 13, is converted into an arbitrary signal format, such as CD or DAT, by a digital filter 16, which is a decimation filter. These data, converted into the arbitrary format, are supplied to a D/A converter 21, via a reproducing system 17 of a digital recorder of an arbitrary format, a reproducing system 18 for the CD or DAT, or a reproducing system 19. An analog audio signal is outputted at an output terminal 22.

FIG. 4 shows an illustrative arrangement of the interpolation circuit 13. The four 1-bit digital data, supplied from the synchronization signal separation and error correction circuit 12 via an input terminal 30, is delayed by a delay circuit 31. The four 1-bit digital data, thus delayed by the delay circuit 31, are supplied to an interpolation unit 32 and a selector 33 for selectively switching between the interpolated data from the interpolation unit 32 and the noninterpolated data from the delay circuit 31.

The interpolation unit 32 includes a moving averaging processing circuit 36, a number estimation processing circuit 37 and an interpolated data generating circuit 38.

The selector 33 includes a selection terminal a supplied with the non-interpolated data from the delay circuit 31, the other selection terminal b supplied with the interpolated data from the interpolation processor 32 and a movable contact c adapted for being selectively moved to the selection terminals a or b responsive to an interpolation on/off control signal supplied via a control signal terminal 34 from the synchronization signal separation and error correction circuit 12.

The circuit for synchronization signal separation and error correction circuit 12 routes an interpolation ON control signal to the control signal terminal 34 when it judges that the four 1-bit digital data reproduced by the reproducing head 11 is a defective data block that cannot be detected by usual error correction. The selector 33 causes its movable contact c to be shifted into contact with the selection terminal b for outputting the interpolated data from the interpolation circuit 13 at an output terminal 35. The synchronization signal separation and error correction circuit 12 routes an interpolation OFF control signal to the selector 33 via the signal control terminal 34 when it judges that the four 1-bit digital data reproduced by the reproducing head 11 is not the defective data block. The selector 33 then causes its movable contact c to be shifted into contact with the selection terminal a for outputting the non-interpolated data at the output terminal 35.

Figure 8A:
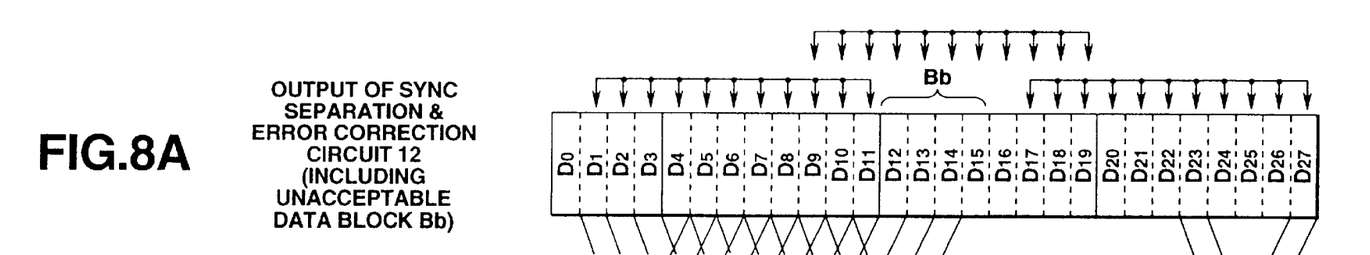
FIG. 8A illustrates a data structure in case bad data has been produced in the 1-bit data string according to the present invention.
Figure 8B:
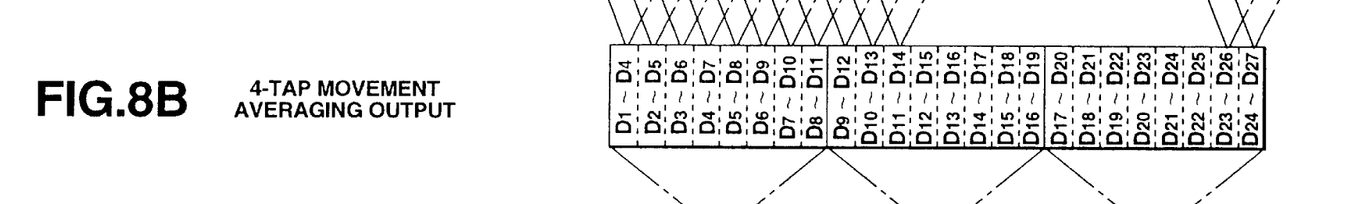
FIG. 8B illustrates a data structure showing a 4 bit-based mean value of a data string positioned ahead of the bad data.
Figures 8C, 8D:
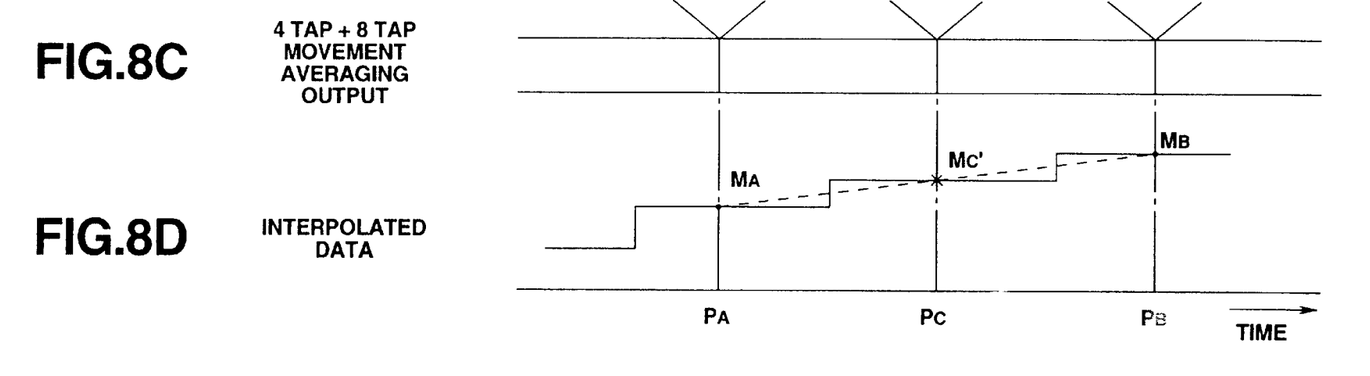
FIG. 8C illustrates a movement mean processing output of eight 4-bit mean values grouped as a set.
FIG. 8D illustrates an interpolated value of the above bad data based upon $M_A$ and $M_B$ generated by movement mean processing.
Figure 9:
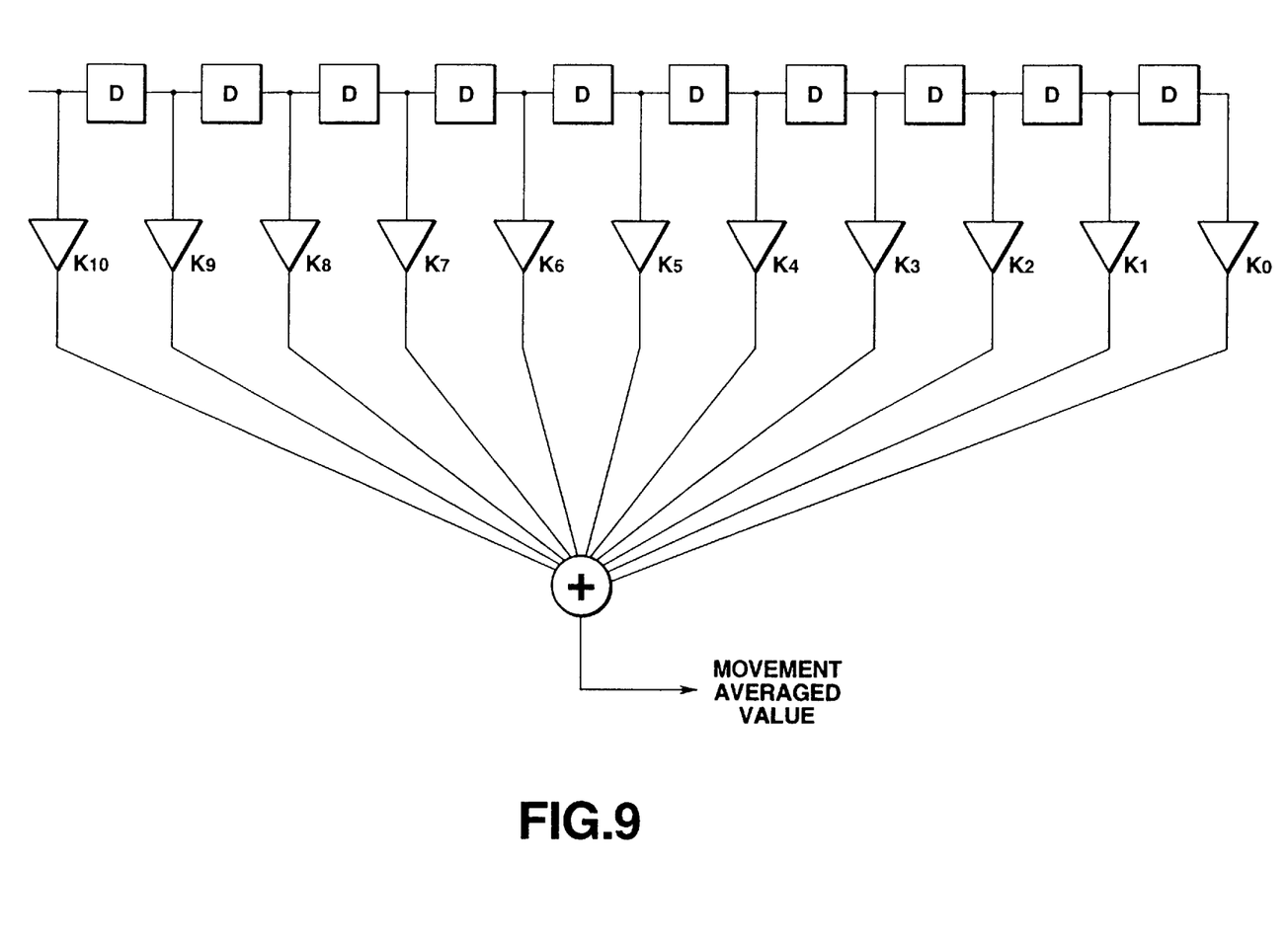
FIG. 9 illustrates an FIR filter for finding the movement mean value.
Figure 10A:
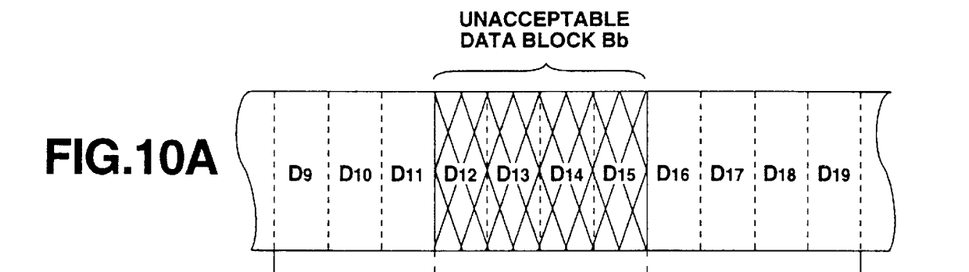
FIG. 10A shows the data structure in case bad data has been produced in the 1-bit data string.
Figure 10B:
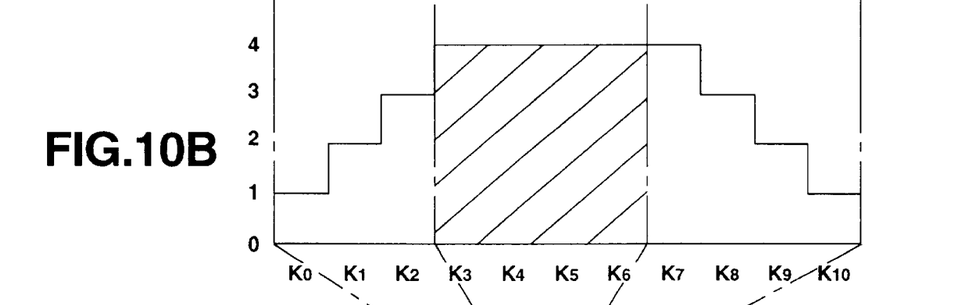
FIG. 10B shows coefficient values of the FIR filter shown in FIG. 9.
Figure 10C:
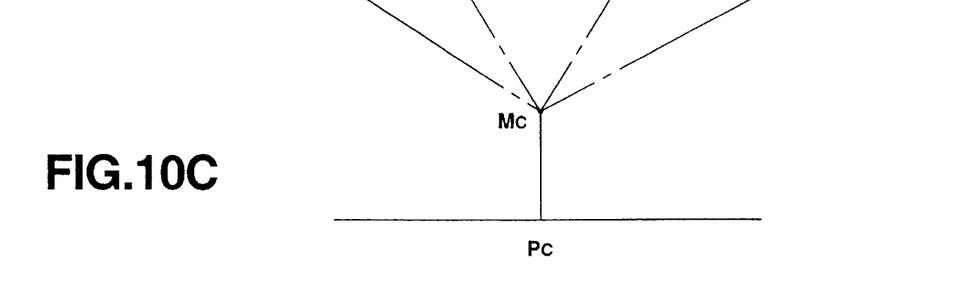
FIG. 10C shows the results of two-stage averaging as an output of the FIR filter.

The principle of the operation of the interpolation processor 32 is explained by referring to FIGS. 8 to 10. It is assumed that a defective data block Bb, made up of four 1-bit digital data $D_{12}$, $D_{13}$, $D_{14}$ and $D_{15}$, has been generated in the 1-bit digital data reproduced from the magnetic tape 9 by the reproducing head 1, as shown in FIG. 8A.

The moving averaging processing circuit 36 performs two-step moving average filtering on the correct eleven 1-bit digital audio data $D_1$ to $D_{11}$ lying ahead of the defective data block Bb with four and eight taps shown in FIG. 8A for deriving a moving average value $M_A$ for point $P_A$ shown in FIG. 8D. The four-tap moving averaging processing is performed on the 1-bit digital audio data $D_1$ to $D_{11}$ shown in FIG. 8A, with four bits grouped in one set, such as sets of $D_1$ to $D_4$, $D_2$ to $D_5$, $D_3$ to $D_6$, $D_4$ to $D_7$, $D_5$ to $D_8$, $D_6$ to $D_9$, $D_7$ to $D_{10}$ and $D_8$ to $D_{11}$, for forming eight 4-tap moving average outputs shown in FIG. 8B. These 4-tap moving average outputs are processed by eight-tap moving averaging of eight outputs of the 4-tap moving averaging, grouped as a set, for deriving eight-tap moving average outputs, for deriving a moving average value $M_A$ for point $P_A$ shown in FIG. 8D.

The two-stage moving averaging filter may be represented by the following equation:

$$M_A = \{(D_1+D_2+D_3+D_4)/4+(D_2+D_3+D_4+D_5)/4+(D_3+D_4+D_5+D_6)/4+(D_4+D_5+D_6+D_7)/4+(D_5+D_6+D_7+D_8)/4+(D_6+D_7+D_8+D_9)/4+(D_7+D_8+D_9+D_{10})/4+(D_8+D_9+D_{10}+D_{11})/4\}/8 \quad (1)$$

The two-stage moving filter may be constituted by a 4-tap finite-duration impulse response (FIR) filter and an 8-tap FIR filter. However, for simplifying the construction, it may be simply constituted by, for example, an 11-tap FIR filter shown in FIG. 9.

An output of the 11-tap FIR filter may be represented by the following equation:

$$M_A = D1 \times K0 + D2 \times K1 + D3 \times K2 + D4 \times K3 + D5 \times K4 + D6 \times K5 + D7 \times K6 + D8 \times K7 + D9 \times K8 + D10 \times K9 + D11 \times K10 \quad (2)$$

The equation (1) may be expanded to $$M_A = (D1 + D2 \times 2 + D3 \times 3 + D4 \times 4 + D5 \times 4 + D6 \times 4 + D7 \times 4 + D8 \times 4 + D9 \times 3 + D10 \times 2 + D11 \times 1)/32 \quad (3)$$

If a 1/32 multiplier is inserted as a multiplying unit in an input stage of the 11-tap FIR filter shown for example in FIG. 9, the two-stage moving filter may be realized by an 11-tap FIR filter shown in FIG. 9, by setting the coefficients K1 to K10 so that K1=1, K2=2, K3=3, K4=4, K5=4, K6=4, K7=4, K8=3, K9=2 and K10=1.

Thus the moving average value $M_A$ may be found by setting the coefficients K1 to K10 of the FIR filter shown in FIG. 9 as shown above and inputting 1-bit digital audio data $D_1$ to $D_{10}$ of the filter.

The moving averaging processing circuit 36 also performs the above-defined 2-stage moving averaging on the correct 11 1-bit digital audio signals $D_{17}$ to $D_{27}$ downstream of the defective data block Bb for deriving a moving average value $M_B$ for point $P_B$.

Similarly to the moving average value $M_A$, the moving average value $M_B$ for point PB may be found by the 11-tap FIR filter shown in FIG. 9. In this case, the coefficients $K_1$ to $K_{10}$ are of the same values as shown above.

Then, using the moving average values $M_A$ and $M_B$ at the two points, a center point Mc of error data is calculated by linear interpolation by $$M_C' = (M_A + M_B)/2$$

The moving average value $M_C$ may also be derived from 11 1-bit digital data $D_9$ to $D_{19}$ containing the defective data block Bb. If the FIR filter shown in FIG. 9 is used, the moving average value $M_C$ is given by:

$$M_C = \{D_9 \times k_0 + D_{10} \times k_1 + D_{11} \times k_2 + D_{12} \times k_3 + D_{13} \times k_4 + D_{14} \times k_5 + D_{15} \times k_6 + D_{16} \times k_7 + D_{17} \times k_8 + D_{18} \times k_9 + D_{19} \times k_{10}\}/32 \quad (4)$$

In the two-stage moving averaging by the moving averaging processing circuit 36, 4-tap moving averaging is performed on four 1-bit digital data from the 1-bit digital data $D_9$, to $D_{19}$, that is $D_9$ to $D_{12}$, $D_{10}$, to $D_{13}$, $D_{11}$ to $D_{14}$, $D_{12}$ to $D_{15}$, $D_{13}$ to $D_{16}$, $D_{14}$ to $D_{17}$, $D_{15}$ to $D_{18}$ and $D_{16}$ to $D_{19}$, to produce eight 4-tap moving averaged outputs, which are further processed with 8-tap moving average processing. Thus the moving average value $M_C$ is given as:

$$\begin{aligned} M_C &= \{(D_9 + D_{10} + D_{11} + D_{12})/4 + (D_{10} + D_{11} + D_{12} + D_{13})/4 + \\ &\quad (D_{11} + D_{12} + D_{14})/4 + (D_{12} + D_{13} + D_{14} + D_{15})/4 + \\ &\quad (D_{13} + D_{14} + D_{15} + D_{16})/4 + (D_{14} + D_{15} + D_{16} + D_{17})/4 + \\ &\quad (D_{15} + D_{16} + D_{17} + D_{18})/4 + (D_{16} + D_{17} + D_{18} + D_{19})/4\}/8 \\ &= \{D_9 \times 1 + D_{10} \times 2 + D_{11} \times 3 + \\ &\quad (D_{12} + D_{13} + D_{14} + D_{15}) \times 4 + D_{16} \times \\ &\quad 4 + D_{17} \times 3 + D_{18} \times 2 + D_{19} \times 1\}/32 \end{aligned} \quad (5)$$

The unknowns are error data $D_{12}$, $D_{13}$, $D_{14}$, $D_{15}$ of the defective data block Bb of FIG. 10A. The coefficients $k_3$ to $k_6$, associated with these terms, are a constant value 4 as shown in FIG. 10B, because of identity of the equations 4 and 5. The coefficients $k_0$, to $k_2$ towards the right, since $k_0=1$, $k_1=2$ and $k_2=3$, as shown in FIG. 10B. The coefficients $k_7$ to $k_{10}$ decay towards the right, since $k_7=4$, $k_8=3$, $k_9=2$ and $k_{10}=1$. The moving averaging circuit 36 performs two-stage moving averaging, using these coefficients shown in FIG. 10B.

Thus, even if the arraying pattern of "1"s and "0"s for the four error data $D_{12}$, $D_{13}$, $D_{14}$, $D_{15}$ are not known, the moving average value $M_C$ may be determined by the number of "1"s and "0"s. The number estimating calculating circuit 37 estimates the numbers of "1"s and "0"s from the equation $(D_{12}+D_{13}+D_1+D_{15}) \approx \{M_C'-(D_9\times1+D_{10}\times2+D_{11}\times3+D_{16}\times4+D_{17}\times3+D_{18}\times2+D_{19}\times1)\}/4$ obtained by setting $M_C \approx M_C'$.

If, in the above equation, D(1)=1 and D(0)=-1, the number estimating circuit 37 estimates the numbers of "1"s and "0"s by:

$D_{12}+D_{13}+D_{14}+D_{15} \approx 4 \rightarrow$ "1", four; "0", zero $D_{12}+D_{13}+D_{14}+D_{15} 2 \rightarrow$ "1", three; "0", one $D_{12}+D_{13}+D_{14}+D_{15} 0 \rightarrow$ "1", two; "0", two $D_{12}+D_{13}+D_{14}+D_{15} -2 \rightarrow$ "1", one; "0", three $D_{12}+D_{13}+D_{14}+D_{15} -4 \rightarrow$ "1", zero; "0"four By performing moving averaging by the moving averaging circuit 36 so that the coefficient values will be constant over the error data width, the number estimating circuit 37 is able to estimate the numbers of "1"and "0"s in the error data easily. Although the four-tap and eight-tap two-stage moving averaging is performed on 4-bit errors, the number of bits, the number of taps or the number of stages is not limited to those given above.

If the number of "0" and "1" in the error data can be estimated by the number estimation circuit 37 as described it becomes possible to maintain the total energy quantity proper to the 1-bit digital data. Thus it is sufficient if the interpolation data generating circuit 38 determines the arraying pattern of the "1"s and "0"s of the interpolated data to generate interpolated data while the energy amount determined by the number of "1"s and "0"s is maintained. For example, if the number of "1"s and "0"s are both two, five patterns of 0011, 0101, 1001, 1010 and 1100 may be thought of as candidate interpolation patterns. Thus it is sufficient if these five arraying patterns are fitted to the defective data block Bb.

Referring to the method for determining the arraying pattern, moving average values of $D_2$ to $D_{12}$ in case of substituting "0"s and "1"s for $D_{12}$ in the defective data block $B_b$ are found.

The moving average values thus found are compared to a linear interpolated value of an interval between $P_A$ and $P_B$ of FIG. 8D as a reference value of the moving average and the moving average closer to the reference value is accepted as a correct value.

The moving average values of $D_3$ to $D_{13}$ are then found by substituting "0"s and "1"s for $D_{13}$.

The moving average values thus found are compared to the reference value of the linearly interpolated moving average and the moving average value closer to the reference value is accepted as correct data.

This operation is repeated for each bit of the defective data block to decide the bits as being "0" or "1". Since the numbers of bits "0"s and "1"s are previously found, the operation is terminated on reaching these numbers.

The interpolation processor 32 interpolates the defective data block $B_b$ in this manner and routes the resulting data to the selection terminal b of the selector 33. If fed with an interpolation ON control signal from the synchronization signal separation and error correction circuit 12 via the control signal terminal 34, the interpolation circuit 13 connects the movable contact c of the selector 33 to the selection terminal b for outputting the interpolated data at the output terminal 35.

Figure 11:
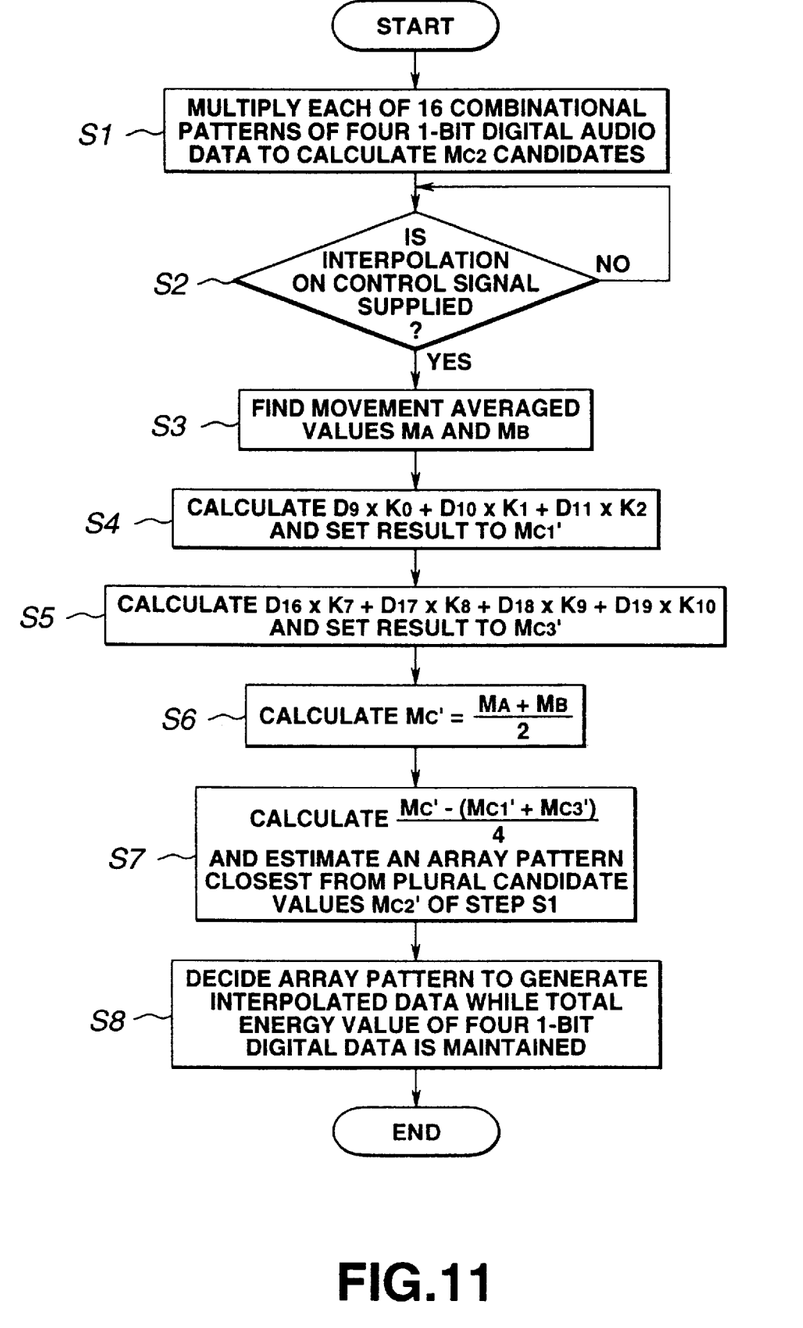
FIG. 11 is a flowchart shoeing the results of bad data estimation according to the present invention.

Based upon the above-described operating principle of the interpolation processor 32, the illustrative operation of the interpolation circuit 13 inclusive of the interpolation processor 32 is explained by referring to the flowchart of FIG. 11. Since the interpolation circuit 13 performs the interpolation under control by the interpolation control circuit 23, the flowchart of FIG. 11 shows the control flow performed by the interpolation control circuit 23.

At step S1, the interpolation control circuit 23 multiplies plural possible number patterns of "1"s and "0"s in the data block comprised of four 1-bit audio data with a constant coefficient shown in FIG. 10B for finding plural candidate values Mc2' corresponding to the defective data block Bb.

The interpolation control circuit 23 then transfers to step S2 for judging whether or not the interpolation ON control signal has been supplied to the control signal terminal 34. If it is judged that the interpolation ON control signal has been supplied to the control signal terminal 34, the interpolation control circuit 23 transfers to step S3 in order to cause the moving averaging circuit 36 to find the moving average values $M_A$ and MB shown in FIG. 8D.

The interpolation control circuit 23 then transfers to step S4 in order to cause the moving averaging circuit 36 to perform the operation of $D_9 \times k_0 + D_{10} \times k_1 + D_{11} \times k_2$ where $D_9$, $D_{10}$ and $D_{11}$ are data lying ahead of the defective data block $B_b$ and the coefficients $k_0$, $k_1$ and $k_2$ are those having a rightwardly rising gradient, as shown in FIG. 10B. The result of the operation is set to $M_{C_l}'$.

The interpolation control circuit 23 then transfers to step S5 in order to cause the moving averaging circuit 36 to perform the operation of $D_{16} \times k_7 + D_{17} \times k_8 + D_{18} \times k_9 + D_{19} \times k_{10}$ where $D_{16}$, $D_{17}$, $D_{18}$ and $D_{19}$ are data subsequent to the defective data block $B_b$ and the coefficients $k_7$, $k_8$, $k_9$ and $k_{10}$ are those having a rightwardly decaying gradient, as shown in FIG. 10B. The result of the operation is set to $Mc_3'$.

The interpolation control circuit 23 then transfers to step S6 in order to calculate an interpolation data candidate Mc'. The interpolation data candidate Mc' may be represented as the sum of one of the plural candidates Mc2' corresponding to the defective data block Bb, the result of calculation Mc1' as found at step S4 and the result of calculation Mc3' as found at step S5. The interpolation control circuit 23 then transfers to step S7 in order to cause the number estimation circuit 37 to calculate $\{Mc'-(Mc1'+Mc3')\}/4$ for estimating one of the plural candidates Mc2' having the closest number pattern of "1"s and "0"s, as found at step Sl.

The interpolation control circuit 23 then transfers to step S8 in order to cause the candidate data generating circuit 38 to generate, based upon an estimated one of the plural candidate values Mc2', the interpolated data with a fixed arraying pattern of "1"s and "0"s, while the total energy value of the four 1-bit digital data is maintained.

The interpolation control circuit 23 controls the various portions of the interpolation circuit 13 for performing the interpolation. Thus it is possible for the reproducing unit 20 of the digital audio recording and/or reproducing apparatus employing the interpolation circuit 13 of the instant embodiment to interpolate 1 bit digital data on the defective data block basis even if the defective data uncorrectable by usual error correction is produced during recording/reproduction of the 1-bit digital data. The processing operations may be simplified since the interpolation circuit 13 determines the arraying pattern after estimating the numbers of "1"s and "0"s.

It is only sufficient to estimate the numbers of "0"s and "1"s in the defective data block, while it is unnecessary to determine the correct arraying pattern of the defective data block.

The reason is that, in the ΣΔ modulated 1-bit data stream, there is no serious error produced in the demodulated data if the arraying pattern in the defective data block is "0010", "1000"or "0100".

However, if the number of "0" or "1" contained in the defective data block is changed, there is produced a serious error in the demodulated data.

In other words, an error in the $\Sigma\Delta$ modulated 1-bit data is significantly dependent upon the numbers of "0"s and "1"s of the data without being dependent upon the data arraying pattern.

The digital data interpolating method and apparatus according to the present invention are applicable not only to the digital audio recording and/or reproducing apparatus. The recording medium on which the 1-bit digital audio data is recorded may also be an optical recording medium. The pre-set number of samples is not limited to four if it is equal to the number of units of data to be corrected for errors.

With the digital data interpolating method according to the present invention, defective data blocks may be interpolated without the necessity of performing complex operations since the "0" and "1" arraying pattern is determined after estimating the numbers of "1"s and "0"s by multiplying the defective data block produced during transmission of the 1-bit digital data by a pre-set coefficient and by multiplying data before and after the defective data with varying coefficients.

In addition, with the digital data interpolating apparatus according to the present invention, interpolation of 1-bit digital data may be achieved without the necessity of performing complex operations since the multiplication means multiplies the defective data block with a pre-set coefficient, data upstream and downstream of the defective data block are multiplied with variable coefficients, the number estimation means estimates the numbers of "1"s and "0"s based upon the output results of the multiplication means and the interpolated data generating means determines the arraying pattern of the interpolated data of the defective data block based upon the numbers of "1"s and "0"s for generating the interpolated data.

What is claimed is:

1. An interpolation apparatus for interpolating a defective data block constituted by pre-set bits, said detective data block having been produced during transmission of digital data digitized by $\Sigma\Delta$ modulation, comprising:

means for calculating a first average value of a data string positioned upstream of the detective data block and not containing the defective data block, a second average value of a data string positioned downstream of the defective data block and not containing the defective data block, and a third average value based upon data lying directly ahead of and following the defective data block in the data string containing the defective data block, the data strings consisting of strings of 1-bit data;

means for generating interpolated data based upon the first average value and the second average value as calculated by said calculating means;

means for estimating an arraying pattern of the defective data block based upon the interpolated data generated by said generating means and said third average value as found by said calculating means; and interpolated data generating means for determining interpolated data of the defective data block based upon the arraying pattern estimated by the estimation means.

2. The interpolation apparatus as claimed in claim 1 wherein the arraying pattern of the defective data block is estimated by estimating the numbers of "0"and "1"s contained in the defective data block.

3. The interpolation apparatus as claimed in claim 1 wherein the calculating means is an impulse responses (IR) filter.

4. The interpolation apparatus as claimed in claim 1 wherein a correct arraying pattern is determined from an arraying pattern candidate estimated by said estimation means, said correct arraying pattern being used as interpolated data.

5. A reproducing apparatus for reproducing digital data digitized by $\Sigma\Delta$ modulation from a recording medium on which said digital data is pre-recorded, comprising:

means for detecting a defective data block in the reproduced digital data;

means for calculating a first average value of a data string positioned upstream of the defective data block and not containing the defective data block, a second average value of a data string positioned downstream of the defective data block and not containing the defective data block, and a third average value based upon data lying directly ahead of and following the defective data block in the data string containing the defective data block, the data strings consisting of strings of 1-bit data;

means for generating interpolated data based upon the first average value and the second average value as calculated by said calculating means;

means for estimating an arraying pattern of the defective data block based upon the interpolated data generated by said generating means and said third average value as found by said calculating means;

interpolated data generating means for determining interpolated data of the defective data block based upon the arraying pattern estimated by the estimation means; and switching means for selecting the reproduced digital data or the digital data via the interpolated data generating means based upon the result of detection by said detection means.

6. A recording apparatus for recording digital data digitized by $\Sigma\Delta$ modulation on a recording medium comprising;

means for detecting a defective data block in the digital data;

means for calculating a first average value of a data string positioned upstream of the defective data block and not containing the defective data block, a second average value of a data string positioned downstream of the defective data block and not containing the defective data block, and a third average value based upon data lying directly ahead of and following the defective data block in the data string containing the defective data block, the data string consisting of strings of 1-bit data;

means for generating interpolated data based upon the first average value and the second average value as calculated by said calculating means;

means for estimating an arraying pattern of the defective data block based upon the interpolated data generated by said generating means and said third average value as found by said calculating means;

interpolated data generating means for determining interpolated data of the defective data block based upon the arraying pattern estimated by the estimation means;

switching means for selecting the reproduced digital data or the digital data via the interpolated data generating means based upon the result of detection by said detection means; and recording means for recording the digital data from said switching means on the recording medium.

7. An interpolation method for interpolating a detective data block constituted by pre-set bits, said defective data block having been generated during transmission of digital data digitized by $\Sigma\Delta$ modulation, comprising the steps of:

calculating a first average value of a data string positioned upstream of the defective data block and not containing the defective data block, a second average value of a data string positioned downstream of the defective data block and not containing the defective data block, and a third average value based upon data lying directly ahead of and following the defective data block in the data string containing the detective data block, the data strings consisting of strings of 1-bit data;

generating interpolated data based upon the first average value and the second average value; determining a candidate of an arraying pattern of said defective data block based upon said calculated interpolated data and said third average value; and determining interpolated data for said defective data block from the thus determined candidate arraying pattern.

8. An interpolation apparatus for interpolating a defective data block constituted by pre-set bits, said detective data block having been produced during transmission of digital data digitized $\Sigma\Delta$ modulation, comprising:

a filter for calculating a first average value of a data string positioned upstream of the defective data block and not containing the defective data block, and a second average value of a data string positioned downstream of the defective data block and not containing the defective data block, the data strings consisting of strings of 1-bit data;

a first calculating unit for calculating a third average value based upon data lying directly ahead of and following the defective data block;

a second calculating unit for generating interpolated data based upon the first average value and the second average value as calculated by said calculating means;

a generator for generating an arraying pattern of the defective data block based upon the interpolated data generated by said generating means and said third average value as found by said calculating means; and an interpolated data generator for determining interpolated data of the defective data block based upon the arraying pattern estimated by said generator.

* * * * *